United States Patent [19]

Seitz et al.

[11] Patent Number: 4,959,435

[45] Date of Patent: Sep. 25, 1990

[54] ORIENTED OPTICALLY TRANSPARENT CRYSTALLINE SYNDIOTATIC VINYLAROMATIC POLYMER

[75] Inventors: Jerry T. Seitz; Charles A. Berglund; Andrew J. Pasztor, Jr., all of Midland, Mich.

[73] Assignees: The Dow Chemical Company, Midland, Mich.; The Dow Chemical Company, Midland, Mich.

[21] Appl. No.: 341,870

[22] Filed: Apr. 24, 1989

Related U.S. Application Data

[62] Division of Ser. No. 152,126, Feb. 4, 1988, Pat. No. 4,824,629.

[51] Int. Cl.$^5$ .................. C08F 12/08; C08F 12/06
[52] U.S. Cl. ........................ 526/347.2; 526/347; 526/347.1; 526/348.1
[58] Field of Search .............. 526/347.1, 347.2, 348.1, 526/347; 524/577

[56] References Cited

U.S. PATENT DOCUMENTS

| | | | |
|---|---|---|---|
| 3,069,406 | 12/1962 | Neuman et al. | 526/347.2 |
| 3,639,332 | 2/1972 | Coover et al. | 526/347.2 |
| 4,680,353 | 7/1987 | Ishihara | 526/160 |
| 4,692,295 | 9/1987 | Vinatier | 526/347.2 |

FOREIGN PATENT DOCUMENTS 222092  4/1988  Japan .................. 526/346

*Primary Examiner*—Joseph L. Schofer
*Assistant Examiner*—F. M. Teskin
*Attorney, Agent, or Firm*—Douglas N. Deline

[57] ABSTRACT

Oriented, syndiotactic, optically transparent vinylaromatic polymers are prepared by a process comprising heating the polymer to a temperature above its crystalline melting point, cooling the polymer to a temperature less than an orientable temperature at a rate sufficient to avoid substantial crystal formation, and inducing strain into the polymer while at a orientable temperature to induce crystal formation and molecular orientation.

5 Claims, No Drawings

ORIENTED OPTICALLY TRANSPARENT CRYSTALLINE SYNDIOTATIC VINYLAROMATIC POLYMER

This is a divisional of application Ser. No. 152,126, filed Feb. 4, 1988, now U.S. Pat. No. 4,824,629.

BACKGROUND OF THE INVENTION

The present invention relates to a syndiotactic vinylaromatic polymer having improved tensile strength. More particularly, the present invention relates to such a syndiotactic vinylaromatic polymer with induced orientation, and to a process for the preparation of such polymers.

Syndiotactic vinylaromatic polymers and a process for their preparation have been disclosed in U.S. Pat. No. 4,680,353, the teachings of which are incorporated herein by reference thereto. In the reference a polymerization catalyst is disclosed which is suitably employed in the preparation of vinylaromatic polymers having a syndiotactic configuration. By the term syndiotactic as used herein is meant that the relative intensity of racemic diads in the nuclear magnetic resonance (NMR) spectrum is higher for such polymers than for polymers of identical monomers obtained by conventional free radical polymerization techniques. A preferred syndiotactic vinylaromatic polymer is syndiotactic polystyrene having a methyl ethyl ketone insoluble polymer content of at least about 75 weight percent.

Syndiotactic vinylaromatic polymers have significantly enhanced resistance to the effects of heat, that is the polymers possess elevated melting temperatures. For example, the crystalline melting point of syndiotactic polystyrene is approximately 270° C. However, the polymers are extremely brittle making them ill-suited for use in certain applications such as molded objects where resistance to shock is desired. For example, normal syndiotactic polystyrene has a tensile strength of only about ½ that of general purpose amorphous atactic polystyrene. In order to provide improved physical properties it would be desirable to provide an oriented syndiotactic polystyrene.

It is previously known in the art to produce oriented fibers or films of thermoplastic molding polymers having improved tensile strength by drawing or otherwise pulling molten samples of the polymer into fibers (uniaxial orientation) or stretching films of the polymer in two directions (biaxial orientation) and cooling the same so as to lock in the desired molecular orientation. However, syndiotactic vinylaromatic polymers generally have glass transition temperatures which are on the order of hundreds of degrees less than the crystalline melt temperature thereof. Molten samples of the polymer are accordingly marked by a lack of viscosity in as much as they are at temperatures far in excess of the glass transition temperature. Such samples exhibit substantially reduced melt strength making it extremely difficult to introduce orientation by means of drawing, melt spinning or other previously known techniques.

The formation of crystalline structure in syndiotactic vinylaromatic polymers proceeds at a faster rate than in the corresponding isotactic polymers. Thus, upon cooling the molten polymer to a temperature less than the crystalline melting point under ambient conditions (referred to hereinafter as quiescent cooling) a highly crystalline but completely random polymer structure develops. For many polymers, the amount of crystallinity obtained in this manner, referred to herein as "normal crystallinity", may be measured by differential scanning calorimetry (DSC) or other suitable techniques. Generally, the normal crystallinity of a syndiotactic vinylaromatic polymer is from about 40 to about 60 percent, as determined by DSC. For syndiotactic vinylaromatic polymers the resulting crystals (normal crystals) are sufficiently large to affect light thereby rendering the polymer substantially optically opaque. Moreover, the presence of normal crystals results in a discrete X-ray diffraction pattern rather than a more diffused scattering that results for smaller crystal size materials. Such polymers are of course unsuited for certain applications requiring clarity such as films for packaging and other applications wherein the contents of a package are to be viewed.

It would be desirable if there were provided a process for producing an oriented, syndiotactic, vinylaromatic polymer.

It would further be desirable if there were provided a process for preparing an oriented, syndiotactic, vinylaromatic polymer wherein molecular orientation in one or two directions is provided.

It would further be desirable to provide an optically transparent, crystalline, syndiotactic, vinylaromatic polymer.

SUMMARY OF THE INVENTION

According to the present invention, there is provided a process for preparing an oriented, crystalline, syndiotactic, vinylaromatic polymer comprising:

(1) heating a syndiotactic vinylaromatic polymer to a temperature above the crystalline melting point;

(2) cooling the syndiotactic vinylaromatic polymer to a temperature less than an orientable temperature at a rate of cooling sufficient to result in a cooled polymer that is substantially amorphous:

(3) heating the syndiotactic vinylaromatic polymer to an orientable temperature:

(4) imparting sufficient strain into the vinylaromatic polymer in one or more directions to produce orientation and crystal formation: and (5) recovering the oriented, crystalline, syndiotactic, vinylaromatic polymer.

In a further embodiment of the present invention, there is provided optically transparent, crystalline, syndiotactic, vinylaromatic polymers which may suitably be prepared by the above technique.

DETAILED DESCRIPTION OF THE INVENTION

By the term "vinylaromatic polymer" as used herein are meant homopolymers of vinylaromatic monomers such as styrene: alkyl styrenes, such as paramethyl vinyltoluene, tertiarybutylstyrene, etc.: halo-styrenes such as chlorostyrene, 1,4-dichlorostyrene, bromostyrene, etc.: alkylhalostyrenes such as 1-chloro-4-vinyltoluene, etc.: and similarly inertly substituted vinylaromatic compounds.

By the term "optically transparent" as used herein is meant an object having a transmittance of at least 50% at a wavelength in the visible spectrum (380 nM–780 nM). Preferably, the object has a thickness of at least 0.005 inch (0.1 mm) and preferable 0.01 inch (0.25 mm).

In the present process, the syndiotactic vinylaromatic polymer is heated to a temperature above its crystalline melting point by any suitable technique. Next the molten polymer is cooled at a rate sufficiently rapid to ensure that the resulting cooled polymer is substantially amorphous rather than crystalline. The resulting cooled material preferably has a degree of crystallinity less than 50 percent, more preferably less than 40 percent and most preferably less than 20 percent on a weight basis. Generally, such a substantially amorphous polymer appears clear or translucent rather than opaque and this fact may be employed by the artisan to determine whether a suitable degree of crystallinity has been attained. The actual degree of crystallinity may be easily determined by differential scanning calorimetry.

The cooling of the syndiotactic vinylaromatic polymer may be occasioned by any suitable technique such as contacting the molten polymer with a cooling mandrel or press retained at a sufficiently low temperature, or by quenching with any fluid such as a gas or liquid capable of imparting the desired rate and degree of cooling. In a preferred embodiment the polymer is cooled while under a pressure of at least about 1000 lb/in$^2$. In a most preferred embodiment it is desirable to employ a rate of cooling of at least about 50 degrees per second until the polymer reaches a temperature less than its glass transition temperature. In the utilization of syndiotactic polystyrene, the polymer is first heated to a temperature of at least about 270° C., most preferably at least about 280° C., and thereafter cooled by the aforesaid rapid cooling to a temperature of less than about 90° C. In a most preferred embodiment, the cooling step from a temperature of 270° C. to 90° C. is accomplished in a time of less than about 10 seconds, most preferably less than about 5 seconds.

At this point, the polymer is substantially transparent as would be expected of an amorphous polymer. If no additional treatment of the polymer occurred, the polymer would remain substantially amorphous for an extended, perhaps indefinite period of time.

Orientation of the syndiotactic vinylaromatic polymer is preferably accomplished by heating the substantially amorphous polymer to a temperature above its glass transition temperature, preferably to a temperature 10-20° above its glass transition temperature and thereafter applying strain thereto in at least one direction. Uniaxial orientation may be easily accomplished by merely stretching the polymer along one axis. Preferably the polymer is stretched at a constant strain rate and may be monitored simultaneously by measuring the birefringence of the polymer to detect the onset of crystallization. Biaxial orientation may be induced by a similar bi-directional stretching using calendaring rolls or similar arrangements or by the use of the well known bubble technique wherein a mandrel or air pressure is employed to expand a tube of the polymer.

It is desirable to initiate the application of stress sufficiently quickly after the polymer reaches an orientable temperature such that the desired small crystallites are formed and polymer orientation occurs before substantial normal crystal formation occurs. It is, of course, necessary to provide sufficient strain such that polymer orientation occur. Most preferably, it is desirable to stretch the polymer so as to provide an extension ratio of at least 3.

In the resulting oriented polymer, the weight percent of polymer in the crystalline form is generally equal to or greater than the normal crystallinity of such polymer. Most preferably, the crystallinity is greater than 40 weight percent. As previously mentioned, the crystallites formed according to the present invention are of a smaller crystal size than normal crystals. Both the amorphous and crystalline regions of the syndiotactic polymer evince orientation as a result of the present process.

Such orientation of the crystalline structure and formation of the desired form of optically transparent, crystalline, syndiotactic polystyrene is also verified by a change in the crystallite size and the orientation of the crystallites as determined by X-ray diffraction. Reduction in the amount of normal crystallinity formed gives improved transparency. Thus, it is particularly desirable to rapidly cool or quench the molten polymer in the cooling step and to impart strain quickly after heating the polymer to an orientable temperature in order to fully realize the benefits of the present invention.

Having described the invention, the following example is provided as further illustrative and is not to be construed as limiting.

EXAMPLE 1

Syndiotactic polystyrene prepared according to the techniques of U.S. Pat. No. 4,680,353 utilizing cyclopentadienyl titanium triphenoxide catalyst and polymethyl aluminoxane cocatalyst is heated and compression molded in a 0.030 inch (0.7 mm) thick 6×8 inch (152×203 mm) compression mold at 290° C. (~1500 lbs/in pressure, 3 minutes mold time). The molded plaque was then rapidly cooled by transferring the same to a similar press maintained at 20° C. for 10 minutes. After releasing the pressure and demolding, the resulting plaque was substantially transparent indicating that the polymer was substantially amorphous. DSC analysis indicated the percent crystallinity was 11±8 percent. (Quiescently crystallized syndiotactic polystyrene has a crystallinity of about 50 percent, that is, this sample of syndiotactic polystyrene has a normal crystallinity of 50%.)

The sample was then cut into strips 0.5 inch (13 mm) wide and 8 inches (203 mm) long that were conditioned at 115° C. for 2.5 minutes. The strips were then stretched at 115° C. using a constant strain rate rheometer. The birefringence of the sample was monitored during the pulling operation as a measure of crystal formation. Stress-strain time measurements were made to determine when crystallization took place. After 2.8 seconds crystallinity was about 50%. The extension ratio was 3. In the absence of strain, the same material crystallizes to form normal crystals in about ten minutes at 115° C.

The sample was removed from the rheometer and tested for tensile properties. Tensile strength was 9890 psi.

EXAMPLE 2

The processing conditions of Example 1 are substantially repeated to provide a narrow strip of optically transparent film approximately 0.029 inches (0.5 mm) in thickness. The films opacity was measured by a scanning spectrophotometer and found to be 50% at 580 nM.

What is claimed is:

1. An oriented, optically transparent, crystalline, syndiotactic, vinylaromatic polymer.

2. The polymer of claim 1 wherein the vinylaromatic monomer is styrene.

3. The polymer of claim 1 having a transmittance of at least 50 percent at a wavelength of from 380 nM to 780 nM with a thickness of at least 0.1 mm.

4. The polymer of claim 3 having said transmittance with a thickness of at least 0.25 mm.

5. The polymer of claim 1 wherein the crystallinity is greater than 40 percent by weight.

* * * * *